United States Patent
Matsui et al.

(10) Patent No.: US 8,384,866 B2
(45) Date of Patent: Feb. 26, 2013

(54) LIQUID CRYSTAL DISPLAY DEVICE COMPRISING FIRST AND SECOND ORGANIC ALIGNMENT FILMS HAVING SLOW AXES ARRANGED TO CROSS EACH OTHER BY ALIGNING POLYMER CHAINS

(75) Inventors: Chikae Matsui, Mobara (JP); Hidehiro Sonoda, Mobara (JP)

(73) Assignees: Hitachi Displays, Ltd., Chiba-ken (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 0 days.

(21) Appl. No.: 11/979,621

(22) Filed: Nov. 6, 2007

(65) Prior Publication Data
US 2008/0106682 A1 May 8, 2008

(30) Foreign Application Priority Data
Nov. 8, 2006 (JP) .................................. 2006-302330

(51) Int. Cl.
G02F 1/141 (2006.01)
G02F 1/1337 (2006.01)
G02F 1/1335 (2006.01)
C09K 19/00 (2006.01)

(52) U.S. Cl. ........ 349/135; 349/123; 349/117; 428/1.26

(58) Field of Classification Search ................... 349/135, 349/123; 428/1.26
See application file for complete search history.

(56) References Cited

U.S. PATENT DOCUMENTS

| | | | | |
|---|---|---|---|---|
| 5,568,294 A * | 10/1996 | Lee | ............................... | 349/117 |
| 6,061,113 A * | 5/2000 | Kawata | ......................... | 349/117 |
| 6,157,427 A * | 12/2000 | Saynor et al. | .................. | 349/123 |
| 6,160,597 A * | 12/2000 | Schadt et al. | .................... | 349/98 |
| 6,524,665 B2 * | 2/2003 | Sahouani et al. | ............... | 428/1.2 |
| 2004/0095536 A1 * | 5/2004 | Yoshida et al. | ................ | 349/117 |
| 2005/0128380 A1 * | 6/2005 | Zieba et al. | ...................... | 349/96 |
| 2006/0024854 A1 * | 2/2006 | Kawamoto et al. | .............. | 438/30 |
| 2006/0072054 A1 * | 4/2006 | Ito | ................................... | 349/96 |
| 2006/0197068 A1 * | 9/2006 | Schadt et al. | .................. | 252/587 |
| 2006/0280880 A1 * | 12/2006 | Park | ................................ | 428/1.1 |
| 2007/0134441 A1 * | 6/2007 | Shutou | ........................... | 428/1.3 |

FOREIGN PATENT DOCUMENTS

| | | |
|---|---|---|
| JP | 07-191313 | 7/1995 |
| JP | 2002-311243 | 10/2002 |
| JP | 2004-157569 | 6/2004 |
| JP | 2005202313 A * | 7/2005 |
| JP | 2005-215115 | 8/2005 |

* cited by examiner

*Primary Examiner* — Edward Glick
*Assistant Examiner* — Dennis Y Kim
(74) *Attorney, Agent, or Firm* — Stites & Harbison, PLLC; Juan Carlos A. Marquez, Esq; Stephen J. Weyer, Esq.

(57) ABSTRACT

The present invention is directed to a VA-mode liquid crystal display panel wherein, by radiating light such as ultraviolet rays to a first alignment film, main chains in molecules of the alignment film are arranged to form a first slow axis. By also radiating the light to a second alignment film, a second slow axis is formed. The first slow axis and the second slow axis are arranged to cross each other. When an electric field is applied to a liquid crystal layer, liquid crystal molecules tilt in the direction which crosses the extending direction of projections formed on a substrate. The projections are formed such that the direction along which the liquid crystal molecules tilt and a first slow axis or a second slow axis differ from each other.

9 Claims, 8 Drawing Sheets

LIQUID CRYSTAL DISPLAY DEVICE COMPRISING FIRST AND SECOND ORGANIC ALIGNMENT FILMS HAVING SLOW AXES ARRANGED TO CROSS EACH OTHER BY ALIGNING POLYMER CHAINS

BACKGROUND OF THE INVENTION

1. Field of the Invention

The present invention relates to a liquid crystal display panel and a liquid crystal display device which uses the liquid crystal display panel, and more particularly to a liquid crystal display device which is operated in a vertical alignment mode (hereinafter referred to as a VA mode) in which liquid crystal molecules are aligned in the direction approximately perpendicular to a surface of a substrate.

2. Description of the Related Art

Liquid crystal display devices have been popularly used as display devices for various information processing devices including personal computers, display devices for television receiver sets and the like. Among these liquid crystal display devices, a liquid crystal display device which uses a VA-mode liquid crystal display panel has been commercialized.

The VA-mode liquid crystal display panel uses liquid crystal having negative dielectric anisotropy and aligns the liquid crystal in the approximately vertical direction between a pair of substrates which constitutes the liquid crystal display panel.

In the VA-mode liquid crystal display panel, in a state where an electric field is not applied to the liquid crystal, liquid crystal molecules are aligned approximately perpendicular to a surface of a substrate. Accordingly, light which is incident on a liquid crystal layer is radiated without substantially changing a plane of polarization in the inside of the liquid crystal layer. In an electric-field non-applied state in which a pair of polarizers is arranged with transmission axes thereof crossing each other orthogonally (crossed Nicols) while sandwiching such a liquid crystal layer therebetween, the VA-mode liquid crystal display panel performs a black display corresponding to performances of the polarizers.

With respect to the VA-mode liquid crystal display device, as can be understood from JP-A-07-191313, for example, researches and developments are in progress to enhance the performance of such a liquid crystal display device.

SUMMARY OF THE INVENTION

However, in the VA-mode liquid crystal display panel, there exists a drawback of a narrow viewing angle which colors the liquid crystal display panel in a specific color when viewed in an oblique direction. To overcome the drawback of the narrow viewing angle, as described in JP-A-07-191313, a MVA (Multi-domain Vertical Alignment)-type liquid crystal display device and a HVA (Hybrid Aligned Nematic)-type liquid crystal display device have been proposed. Further, several attempts have been made to broaden a viewing angle using a retardation film in various liquid crystal display devices besides the VA-mode liquid crystal display panel.

However, any one of known methods is not a fundamental solution method and, particularly, the method which uses the retardation film has a drawback that the method pushes up a manufacturing cost due to the use of the expensive retardation film.

Accordingly, it is an object of the present invention to provide a liquid crystal display device which can overcome the above-mentioned drawbacks of the related art.

The liquid crystal display device of the present invention is configured to include a first substrate, a second substrate, and a liquid crystal layer sandwiched between the first and the second substrate, wherein a first organic film is formed on a liquid-crystal-layer side of the first substrate, and a second organic film is formed on a liquid-crystal-layer side of the second substrate. A first slow axis is formed in the first organic film due to the radiation of light, a second slow axis is formed in the second organic film due to the radiation of light, and the first slow axis and the second slow axis are arranged to cross each other.

By making a direction along which liquid crystal molecules tilt when an electric field is applied to the liquid crystal layer and either one of the first slow axis and the second slow axis differ from each other, a viewing angle of the VA-mode liquid crystal display device can be enlarged.

According to the present invention, it is possible to acquire a liquid crystal display device having a wide viewing angle with this simple structure without using an expensive retardation film in the VA-mode liquid crystal display panel.

To be more specific, the liquid crystal display device of the present invention is configured to include a liquid crystal display panel which is constituted of a TFT substrate on which pixel portions each of which has a TFT, a pixel electrode and the like are arranged in a matrix array, a color filter substrate on which color filters and the like are formed, a liquid crystal layer which is sandwiched between the TFT substrate and the color filter substrate which overlap each other, and a sealing material or the like which seals peripheries of both substrates, wherein a first alignment film formed of an organic film is formed on a liquid-crystal-layer side of the TFT substrate and a second alignment film formed of an organic film is formed on a liquid-crystal-layer side of the color filter substrate.

On the TFT substrate, first projections which extend while being bent in a zigzag manner in the first direction and in the second direction which crosses the first direction are formed. On the color filter substrate, second projections which extend while being bent in a zigzag manner in the first direction and in the second direction which crosses the first direction are formed in the same manner as the first projections.

Further, the first slow axis is formed by aligning polymer chains in the first alignment film with the radiation of light such as ultraviolet rays to the first alignment film, and the second slow axis is also formed in the second alignment film with the radiation of light such as ultraviolet rays to the second alignment film. The first slow axis and the second slow axis are arranged to cross each other.

In a state where an electric field is not applied to the liquid crystal layer, the liquid crystal molecules are used in the VA mode in which the liquid crystal molecules are aligned vertically, while when the electric field is applied to the liquid crystal layer, the liquid crystal molecules tilt in the direction which crosses the extending directions of the first projections and the second projections. The first projections and the second projections are formed such that the direction along which the liquid crystal molecules tilt and either one of the first slow axis and the second slow axis differ from each other.

By arranging the first slow axis and the second slow axis in a state where the first slow axis and the second slow axis cross each other in the liquid crystal display panel used in a VA mode, it is possible to impart a function of a retardation film which widens a viewing angle of a VA-mode liquid crystal display device to the alignment film.

DESCRIPTION OF THE PREFERRED EMBODIMENTS

Figure 1:
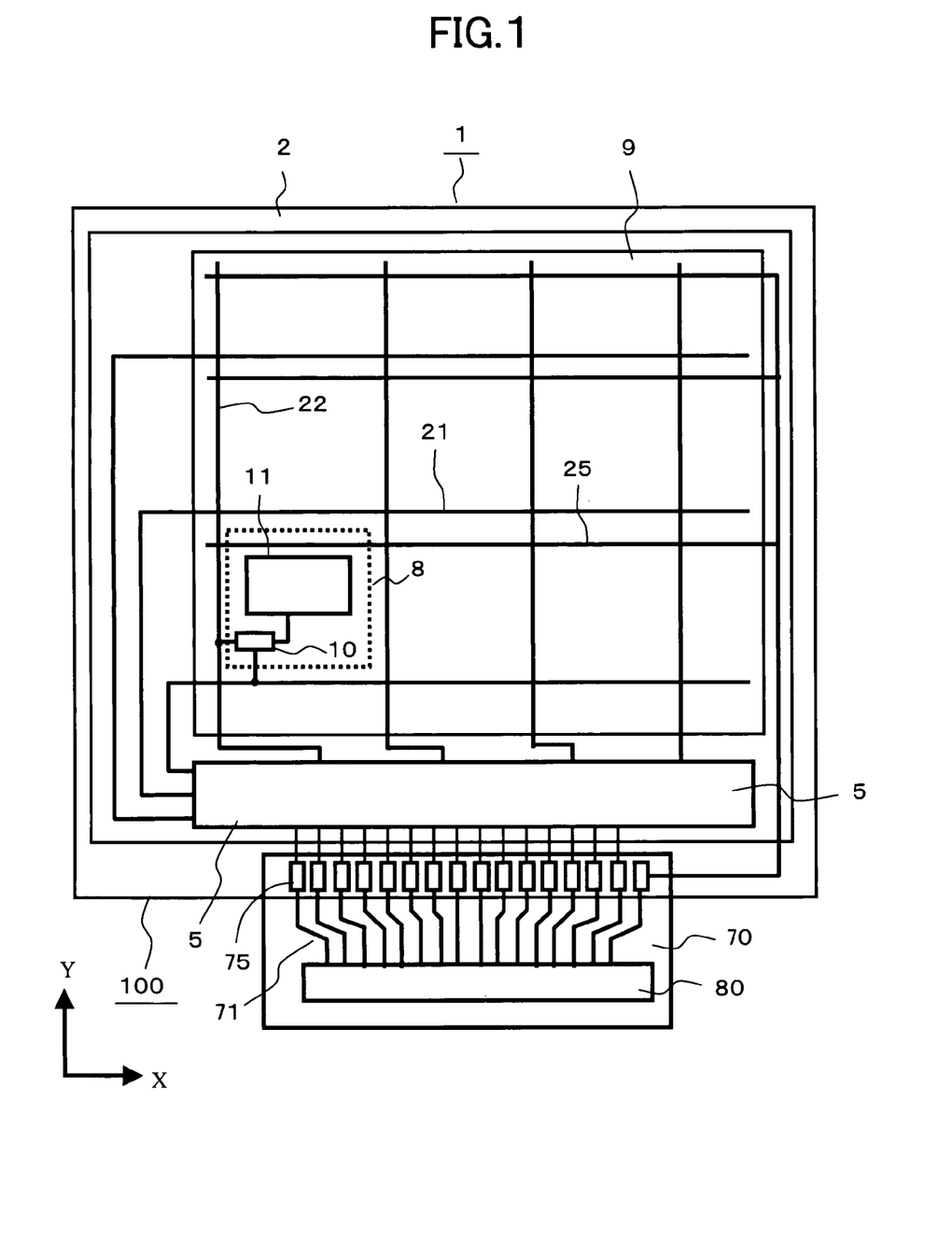
FIG. 1 is a plan view showing the schematic constitution of a liquid crystal display device which constitutes an embodiment of the present invention.

FIG. 1 is a plan view showing a liquid crystal display device 100 according to the present invention. The liquid crystal display device 100 is constituted of a liquid crystal display panel 1 and a control circuit 80. Signals necessary for a display of the liquid crystal display panel 1 are supplied from the control circuit 80. The control circuit 80 is mounted on a flexible printed circuit board 70 and transmits signals to the liquid crystal display panel 1 via lines 71 and terminals 75.

A pixel electrode 11 is formed in each pixel portion 8 of the liquid crystal display panel 1. Here, although the liquid crystal display panel 1 includes a large number of pixel portions 8 which are arranged in a matrix array, to facilitate the understanding of the pixel portion 8, only one pixel portion 8 is illustrated in FIG. 1. The pixel portions 8 which are arranged in a matrix array form a display region 9, wherein the respective pixel portions 8 play a role of pixels of an image and display the image on the display region 9.

In FIG. 1, gate signal lines (also referred to as scanning lines) 21 which extend in the direction x and are arranged in parallel to the direction y in the drawing, and drain signal lines (also referred to as video signal lines) 22 which extend in the direction y and are arranged in parallel in the direction x in the drawing are formed, and the pixel portion 8 is formed in a region which is surrounded by the gate signal lines 21 and the drain signal lines 22. Further, common signal lines 25 are arranged in parallel to the gate signal lines 21 and supply voltages which are applied to holding capacitance electrodes of the respective pixel portions 8.

The pixel portion 8 includes a switching element 10. With the supply of a control signal from the gate signal line 21, an ON/OFF control of the switching element 10 is performed. When the switching element 10 assumes an ON state, a video signal transmitted via the drain signal lines 22 is supplied to the pixel electrode 11.

The gate signal lines 21 and the drain signal lines 22 are connected to a drive circuit 5, and control signals and video signals are outputted from the drive circuit 5 to the gate signal lines 21 and the drain signal lines 22.

Figure 2:
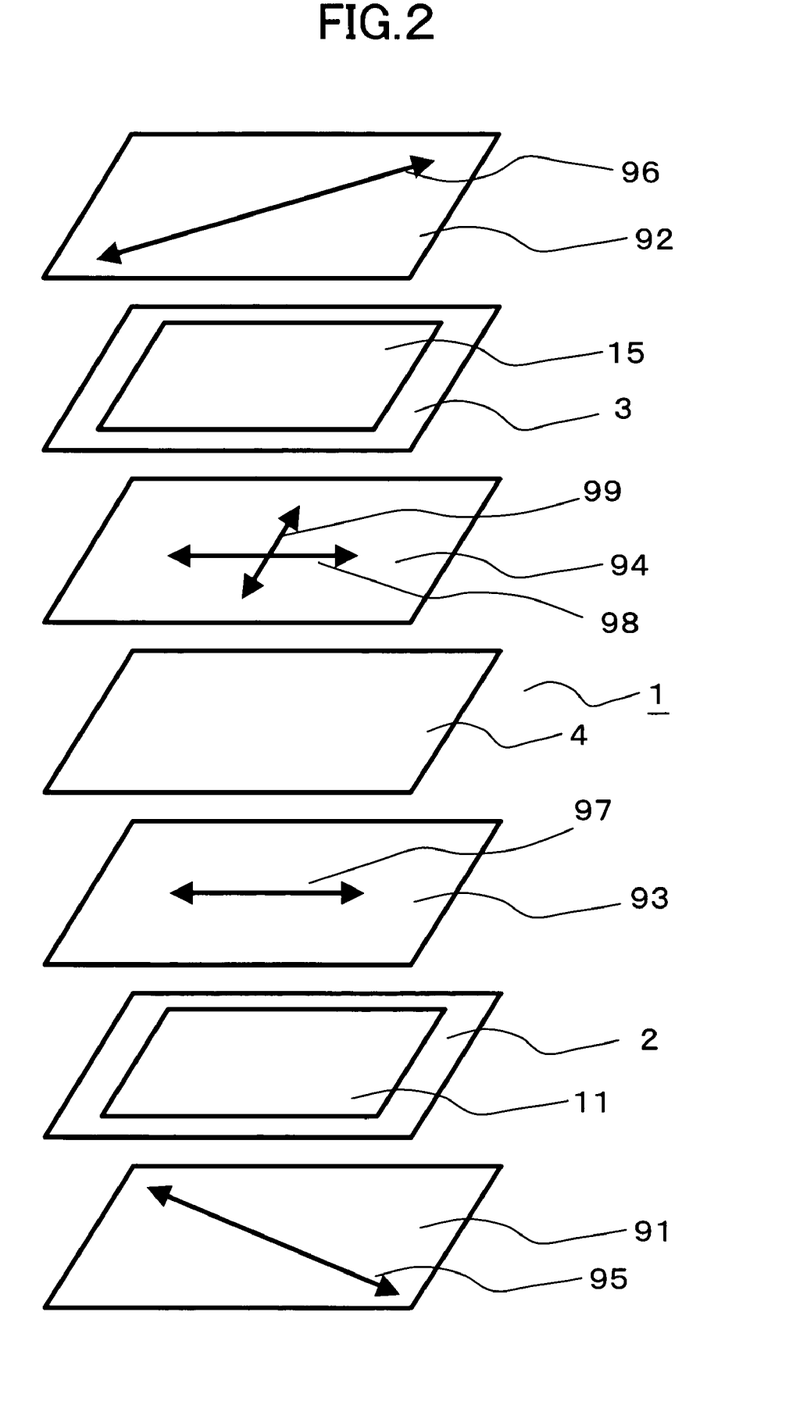
FIG. 2 is a schematic developed view showing a liquid crystal display panel of the liquid crystal display device which constitutes the embodiment of the present invention.

Next, FIG. 2 is a schematic developed view showing the basic constitution of the VA-mode liquid crystal display panel 1. The liquid crystal display panel 1 is constituted of a pair of glass substrates 2, 3 which face each other in an opposed manner and a liquid crystal layer 4 which is sealed between the pair of glass substrates 2, 3. A first polarizer 91 having a transmission axis in the direction indicated by an arrow 95 is arranged below the liquid crystal display panel 1, while a second polarizer 92 having a transmission axis in the direction indicated by an arrow 96 is arranged above the liquid crystal display panel 1.

The pixel electrodes 11 are formed on the glass substrate 2, while counter electrodes 15 are formed on the glass substrate 3. The liquid crystal layer 4 is formed of liquid crystal having negative dielectric anisotropy. In a non-driving state in which an electric field is not applied between the pixel electrode 11 and the counter electrode 15, liquid crystal molecules in the vicinity of the lower substrate as well as in the vicinity of the upper substrate are aligned substantially perpendicular to the respective substrates.

In the non-driving state, the liquid crystal molecules are aligned substantially perpendicular to the substrate and hence, light which is incident on the liquid crystal layer 4 after passing though the first polarizer 91 advances without changing a polarization axis thereof. Accordingly, the light does not pass through the second polarizer 92 having the transmission axis thereof arranged orthogonal to the transmission axis of the first polarizer 91 and performs a black display.

To perform a white display, a driving state is brought about by applying a voltage between the pixel electrode 11 and the counter electrode 15. In the driving state, the liquid crystal molecules tilt in the direction indicated by an arrow 97 due to the lower alignment film 93, and the liquid crystal molecules tilt in the direction indicated by an arrow 98 due to the upper alignment film 94. Here, the light whose polarization axis is rotated by the liquid crystal molecules passes through the second polarizer 92 and hence, a desired white display is acquired when viewed from a front side of the panel.

According to the present invention, the alignment film 93 in FIG. 2 has a slow axis thereof arranged in the same direction indicated by the arrow 97 due to an index ellipsoid having retardation. Further, the alignment film 94 has a slow axis 99 thereof arranged orthogonal to the direction 98 along which the liquid crystal molecules tilt due to an index ellipsoid having retardation.

Figure 3:
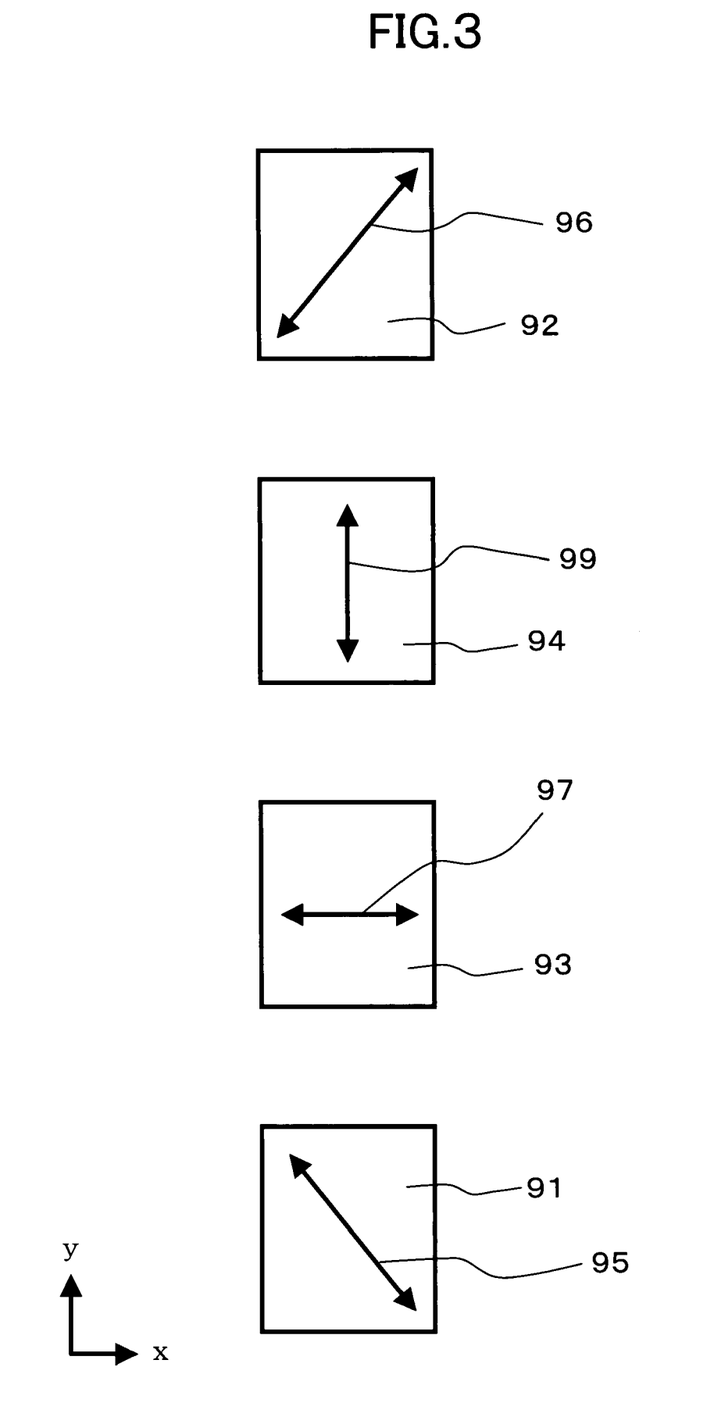
FIG. 3 is a schematic developed view showing an alignment film of the liquid crystal display device which constitutes the embodiment of the present invention.

Next, the alignment films 93, 94 are explained in conjunction with FIG. 3. The x-axis direction and the y-axis direction are determined on a plane equal to a plane of the drawing as shown in FIG. 3, and the direction perpendicular to the plane of the drawing is set as the z-axis direction. The alignment film 93 has the slow axis thereof directed in the direction x, and the retardation has a relationship of nx>ny=nz.

Further, the alignment film 94 has the slow axis thereof directed to the y direction, and the retardation has a relationship of ny>nx=nz. Accordingly, when the alignment film 93 and the alignment film 94 overlap each other in a state where the slow axes thereof cross each other orthogonally, a total value of the retardation of the alignment film 93 and the retardation of the alignment film 94 is set to satisfy the relationship of nx=ny>nz.

By arranging the slow axes 97, 99 of the alignment film to make 45 degrees with respect to the transmission-axis directions 95, 96 of the polarizers 91, 92, there exists a possibility that a large Rth is acquired. Here, Rth is a value obtained by a formula Rth=((nx+ny)·2−nz)×d.

Figure 4:
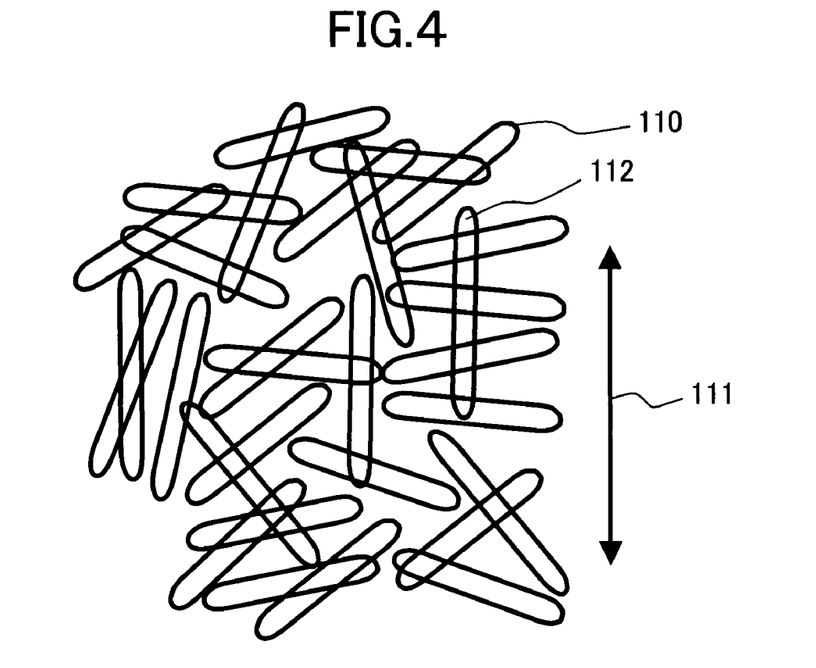
FIG. 4 is a schematic view showing the alignment film of the liquid crystal display device which constitutes the embodiment of the present invention.
Figure 5:
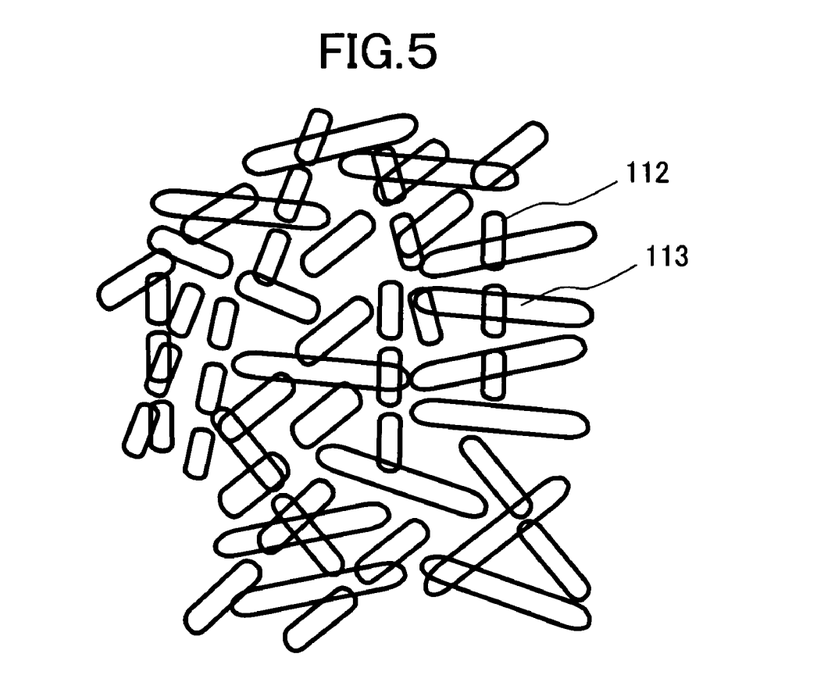
FIG. 5 is a schematic view showing the alignment film of the liquid crystal display device which constitutes the embodiment of the present invention.
Figure 6:
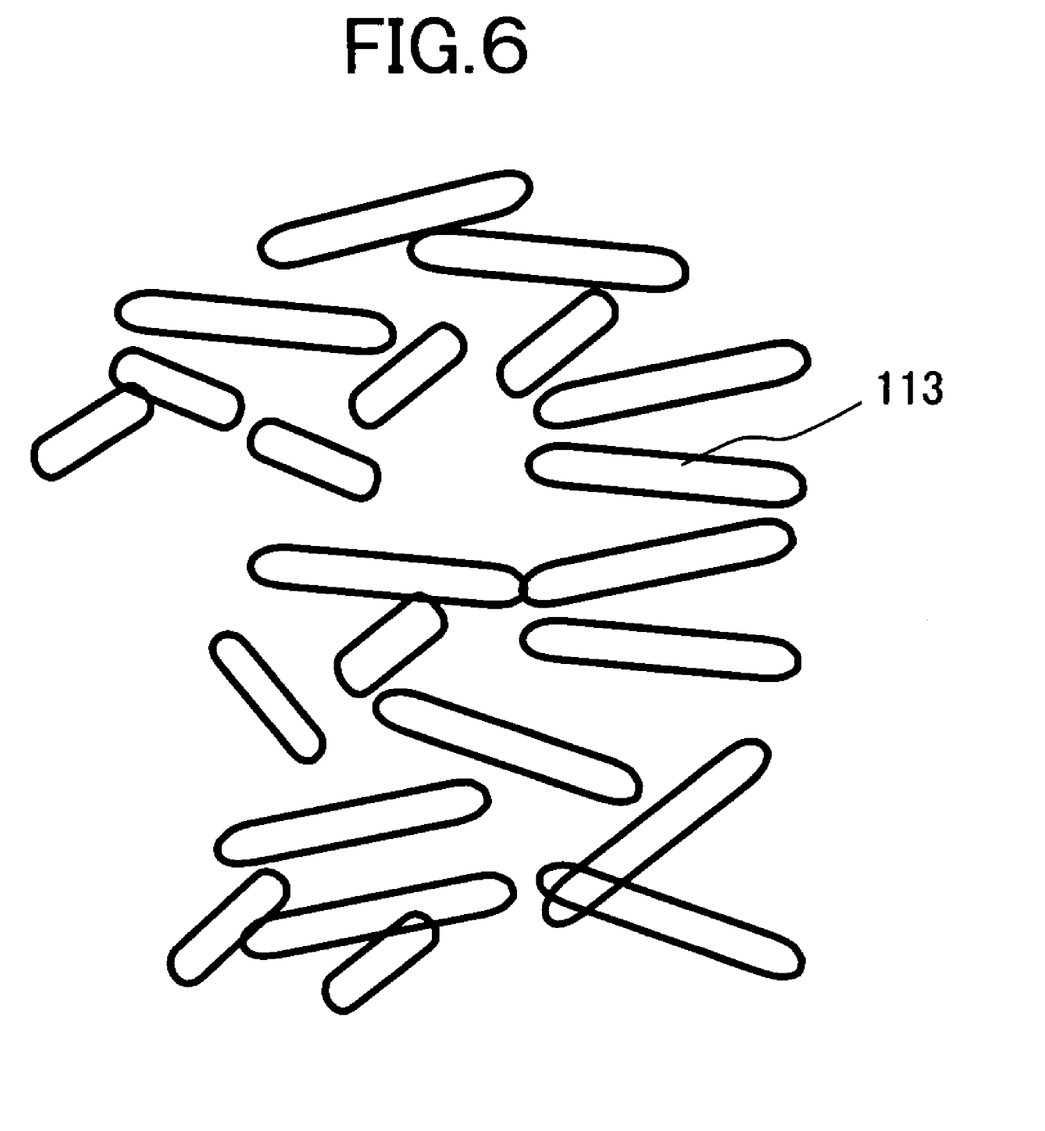
FIG. 6 is a schematic view showing the alignment film of the liquid crystal display device which constitutes the embodiment of the present invention.

Next, the explanation is made with respect to the alignment film having the retardation in conjunction with FIG. 4 to FIG.

6. FIG. 4 shows a state in which polymer molecules of the alignment film are arranged. For example, the alignment film is formed by spin-coating polyimide. Here, polymer chains 110 of polyimide are directed in the random direction as shown in FIG. 4.

As shown in FIG. 4, ultraviolet rays which are linearly polarized in the direction indicated by an arrow 111 are radiated to the alignment film (polyimide). When the ultraviolet rays are radiated to the polyimide, the polymer chains 112 in polyimide which are substantially parallel to the polarization direction of the radiated ultraviolet rays absorb a large quantity of ultraviolet rays. The polymer chains 112 which absorb the ultraviolet rays become short by being cut by the ultraviolet rays. Accordingly, as shown in FIG. 5, the polymer chains 112 of polyimide arranged substantially parallel to the polarization direction of ultraviolet rays become short by cutting.

As shown in FIG. 6, when polyimide is heated simultaneously with the radiation of the ultraviolet rays or after the radiation of ultraviolet rays, the shortened polymer chains by cutting are decomposed. Accordingly, the polymer chains 113 in the direction orthogonal to the polarization direction of the ultraviolet rays become relatively longer than the polymer chains 112 in the direction parallel to the polarization direction of the ultraviolet rays.

In general, the polymer chains having the direction along which the polymer chains can easily absorb the ultraviolet rays with respect to the polarization direction of the ultraviolet rays have the optical anisotropy. Accordingly, by aligning the direction along which the polymer chains are arranged due to the radiation of the ultraviolet rays, it is possible to make the polymer chains to exhibit the optical anisotropy. For example, due to the radiation of the ultraviolet rays, it is possible to form a slow axis in the direction parallel to the polymer chains.

Accordingly, by radiating the ultraviolet rays to the alignment film to be formed for restricting the alignment direction of the liquid crystal molecules and by adjusting the radiation direction and the radiation intensity, the alignment film can obtain the desired retardation.

Since the alignment films are formed in two layers with the liquid crystal layer sandwiched therebetween, by radiating the ultraviolet rays to generate the slow axes in the directions different from each other between two layers, it is possible to make use of the retardation generated by overlapping two layers.

Figure 7:
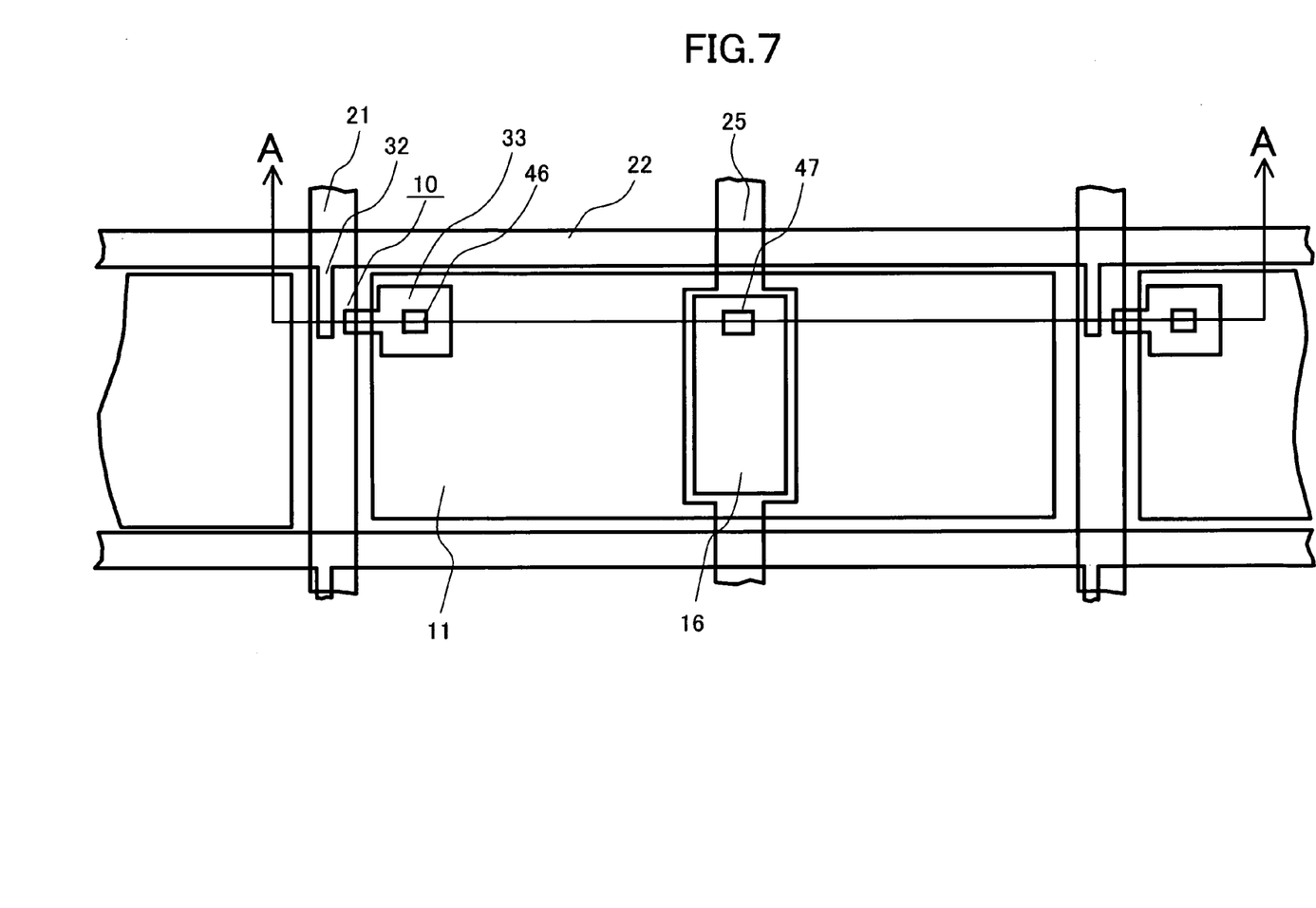
FIG. 7 is a schematic plan view showing a pixel portion of the liquid crystal display device which constitutes the embodiment of the present invention.
Figure 8:
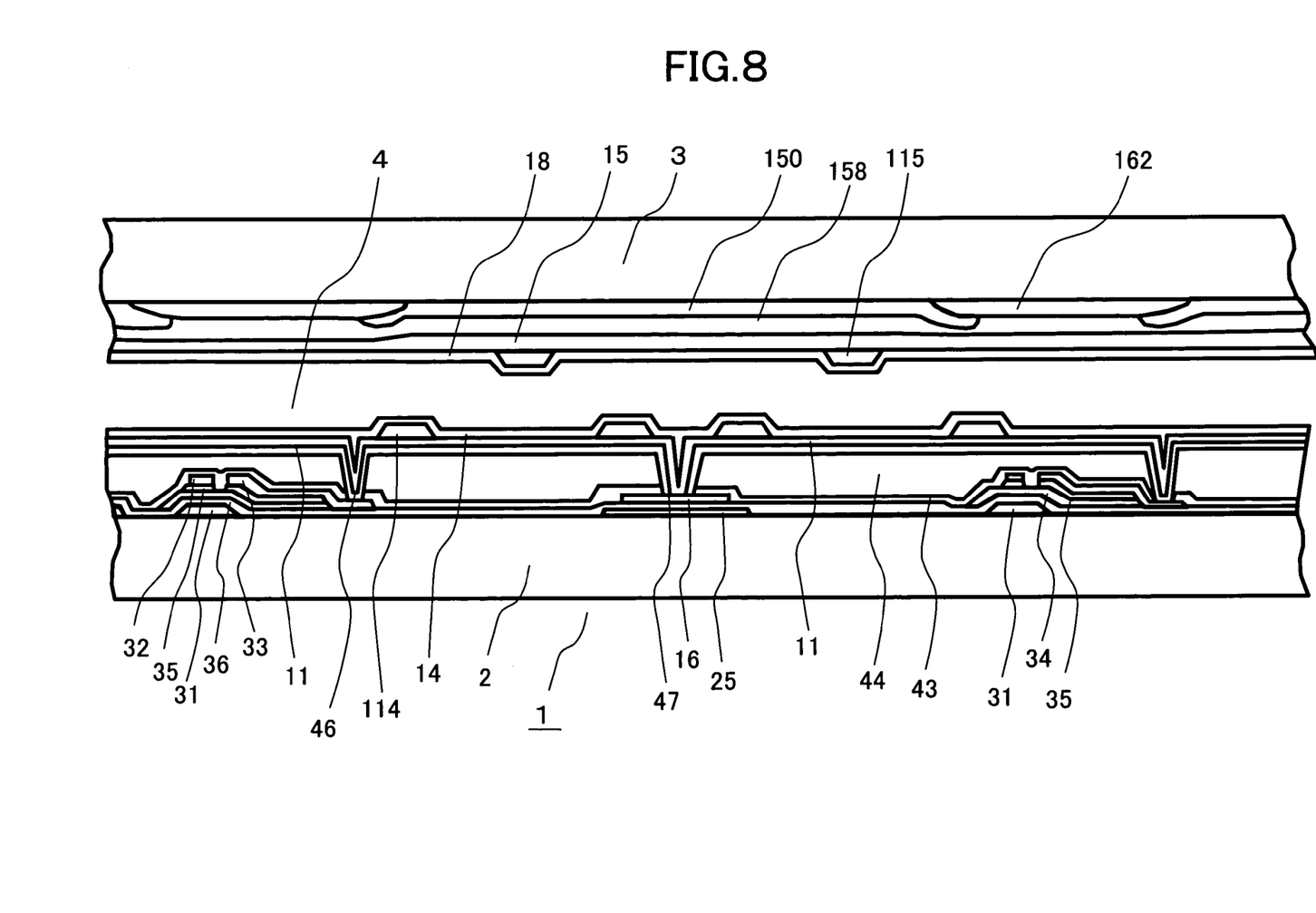
FIG. 8 is a schematic cross-sectional view showing the pixel portion of the liquid crystal display device which constitutes the embodiment of the present invention.

Next, the explanation is made with respect to the pixel portion 8. FIG. 7 is a plan view of the pixel portion 8, and FIG. 8 is a cross-sectional view taken along a line A-A in FIG. 7. As shown in FIG. 7, the gate signal lines 21 and the drain signal lines 22 are formed in a crossing manner, and the capacitance line 25 is formed in parallel to the gate signal line 21. The pixel electrode 11 is formed in the region surrounded by the gate signal lines 21 and the drain signal lines 22.

The pixel electrode 11 and the capacitance line 25 overlap each other to form the holding capacitance. A through hole 47 is formed in the pixel electrodes 11 so as to electrically connect a holding capacitance electrode 16 and the pixel electrode 11.

A switching element (hereinafter also referred to as a thin film transistor or a TFT) 10 is formed in the vicinity of a crossing portion of the gate signal line 21 and the drain signal line 22. The TFT 10 assumes an ON state in response to a gate signal supplied via the gate signal line 21, and writes a video signal supplied via the drain signal line 22 in the pixel electrode 11 via a drain electrode 32, a source electrode 33 and a through hole 46.

Next, the pixel portion is explained in conjunction with FIG. 8 which is a schematic cross-sectional view of a pixel portion. In the liquid crystal display panel 1, the TFT substrate 2 and the color filter substrate 3 are arranged to face each other in an opposed manner. The liquid crystal composition 4 is held between the TFT substrate 2 and the color filter substrate 3. Here, on peripheral portions of the TFT substrate 2 and the color filter substrate 3, a sealing material (not shown in the drawing) is provided. The TFT substrate 2, the color filter substrate 3 and the sealing material form a container with a small gap defined between the TFT substrate 2 and the color filter substrate 3, and the liquid crystal composition 4 is sealed between the TFT substrate 2 and the color filter substrate 3. Here, numeral 14 and numeral 18 respectively indicate alignment films which control the alignment of liquid crystal molecules.

Figure 9:
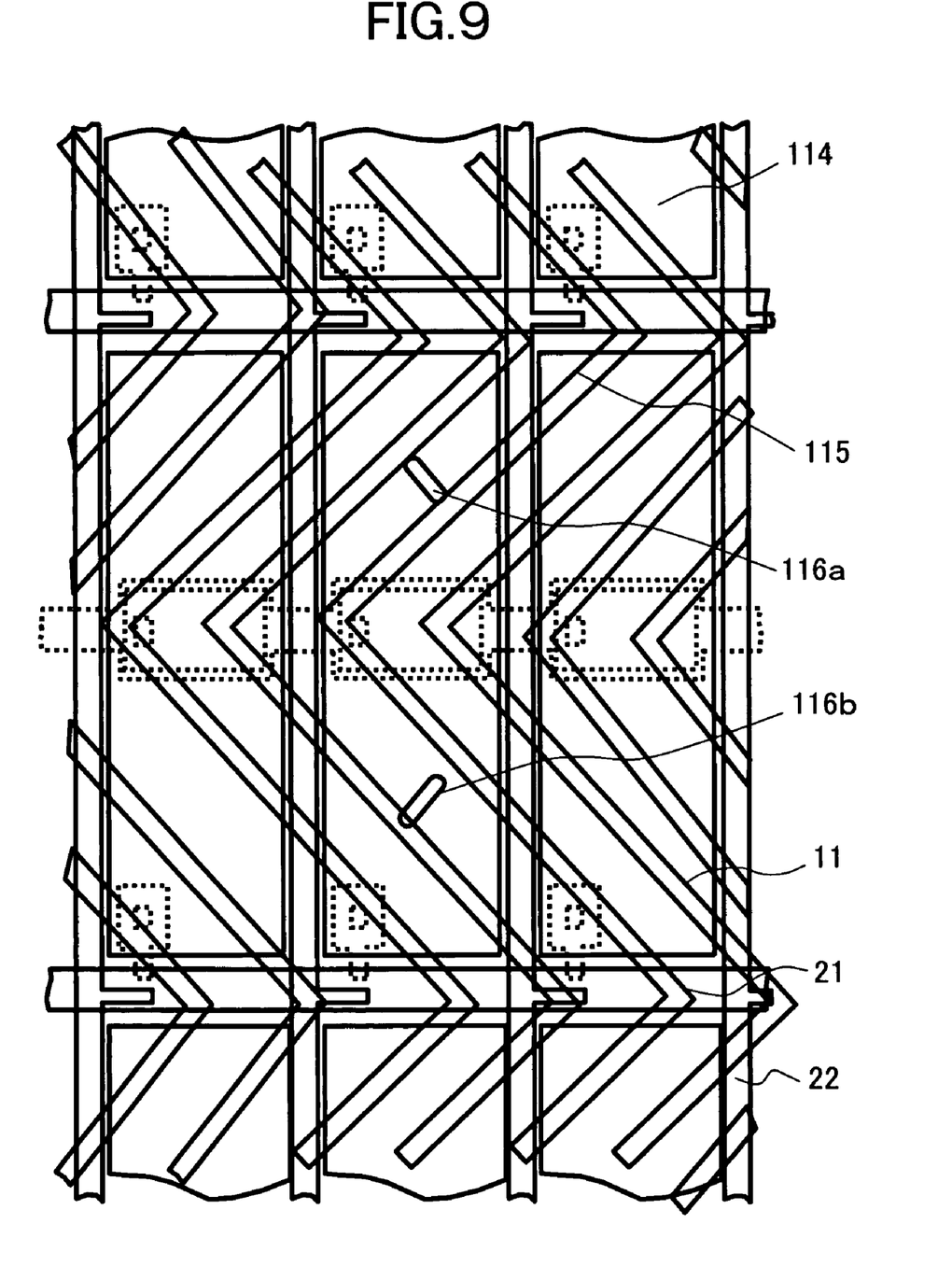
FIG. 9 is a schematic plan view showing projections of the liquid crystal display device which constitutes the embodiment of the present invention.

For preventing FIG. 7 from becoming complicated, projections 114, 115 which restrict the alignment direction of the liquid crystal molecules are omitted. However, the projections 114 are provided below the alignment film 14 of the TFT substrate 2, and the projections 115 are provided below the alignment film 18 of the color filter substrate 3. These projections 114, 115 are formed in a zigzag shape as shown in FIG. 9.

The TFT substrate 2 on which the pixel portions 8 explained in conjunction with FIG. 7 are mounted has at least a portion thereof made of transparent glass, resin or the like. As mentioned previously, the gate signal lines 21 (not shown in FIG. 8) are formed on the TFT substrate 2, wherein the gate signal line 21 is formed of a multi-layered film consisting of a layer which mainly contains molybdenum (Mo), chromium (Cr) or Zirconium (Zr) and a layer which mainly contains aluminum (Al). Further, the gate signal line 21 has inclined side surfaces such that a line width of the gate signal line 21 is widened from an upper surface to a lower surface thereof on a TFT substrate side. A portion of the gate signal line 21 forms a gate electrode 31. In FIG. 8, the gate electrode 31 is illustrated.

A gate insulation film 36 is formed so as to cover the gate electrode 31, and a semiconductor layer 34 which is constituted of an amorphous silicon film is formed on the gate insulation film 36. An n+ layer 35 is formed on the semiconductor layer 34 by implanting impurities. The n+ layer 35 is an ohmic contact layer and is provided for favorably electrically connecting the semiconductor layer 34 with a metal layer. On the semiconductor n+ layer 35, the drain electrode 32 and a source electrode 33 are formed in a spaced-apart manner. Here, although the naming of drain and source is changed depending on potentials applied to the electrodes, in this specification, the electrode which is connected with the drain signal line 22 is referred to as a drain electrode.

The drain signal line 22, the drain electrode 32 and the source electrode 33 are respectively formed of a multi-layered film which sandwiches a layer which contains an aluminum as a main component between two layers which contain an alloy of molybdenum (Mo) and chromium (Cr), molybdenum (Mo) or tungsten (W) as a main component.

An inorganic insulation film 43 and an organic insulation film 44 are formed on the TFT 30. A through hole 46 is formed in the inorganic insulation film 43 and the organic insulation film 44 so as to electrically connect the source electrode 33 and the pixel electrode 11. The inorganic insulation film 43 may be formed of a silicon nitride film SiN or a silicon oxide film SiO2, while the organic insulation film 44 may be formed of an organic resin film. Although a surface of the organic insulation film 44 may be formed in a relatively flat plane, such a surface may be formed in an uneven plane.

The pixel electrode 11 is formed of a transparent conductive film, wherein the transparent conductive film is constituted of a light-transmitting conductive layer made of ITO (indium tin oxide), ITZO (indium tin zinc oxide), IZO (indium zinc oxide), ZnO (zinc oxide), SnO (tin oxide), In2O3 (indium oxide) or the like.

Here, the above-mentioned layer which contains chromium as a main component may be made of chromium in a single form or an alloy of chromium and molybdenum (Mo) or the like, the layer which contains zirconium as a main component may be made of zirconium in a single form or an alloy of zirconium and molybdenum or the like, the layer which contains tungsten as a main component may be made of tungsten in a single form or an alloy of tungsten and molybdenum or the like, and a layer which contains aluminum as a main component may be made of aluminum in a single form or an alloy of aluminum and neodymium or the like.

The capacitance line 25 is connected to the holding capacitance portion 13. A holding capacitance electrode 26 is formed on the capacitance line 25 in an opposed manner with an inorganic insulation film 43 sandwiched therebetween. The holding capacitance electrode 26 and the pixel electrode 11 are connected with each other via a through hole 47 formed in the organic insulation film 44. Here, the holding capacitance electrode 26 may be formed using the same steps and the same material as the drain signal line 22.

As described above, the projections 114 which restrict the alignment direction of the liquid crystal molecules are formed on the pixel electrode 11. The projections 115 are also formed on the color-filter-substrate-3 side in the same manner.

The color filter substrate 3 is a substrate made of glass, resin or the like, and is formed of color filters 150 which allow light having specific wavelengths to pass through and a black mask 162 which is a light blocking layer for defining the respective color filters 150. An overcoat film 158 is formed on the color filters 150 and the black mask 162.

The counter electrode 15 is formed on the overcoat film 158, the above-mentioned projections 115 are formed on the counter electrode 15, and the alignment film 18 is formed on the counter electrode 15 and the projection 115 in a state where the alignment film 18 covers the counter electrode 15 and the projections 115.

As described previously, the retardation is generated in the alignment films 14, 18 due to the radiation of the ultraviolet rays. Here, the direction along which the polymer chains (main chains) of the alignment films 14, 18 extend forms a slow axis. The alignment film 14 and the alignment film 18 respectively have the slow axis and hence, the alignment film 14 and the alignment film 18 respectively constitute the index ellipsoids. However, by overlapping the alignment film 14 and the alignment film 18 such that the slow axes of the alignment film 14 and the alignment film 18 cross each other orthogonally, a relationship of nx=ny>nz can be established between two alignment films and hence, it is possible to optically compensate for a viewing angle.

Here, in the VA-mode liquid crystal display element, it is necessary to review a relationship between the projections 114, 115 which restrict the above-mentioned alignment direction and the slow axes of the alignment films 14, 18.

Next, the explanation is made with respect to the projections 114, 115 and the direction along which the liquid crystal molecules 116 tilt in conjunction with FIG. 9. As shown in FIG. 9, the projections 114 and the projections 115 are bent in a zigzag manner, and are formed alternately as viewed in a plan view.

Since the liquid crystal molecules on the projections 114, 115 are aligned perpendicularly, the liquid crystal molecules are aligned in the direction perpendicular to inclined surfaces of the projections 114, 115. Here, the inclined surfaces are inclined with respect to a main surface of each substrate and hence, even in a state in which an electric field is not applied, the liquid crystal molecules on the projections 114, 115 are aligned with each other with an inclination with respect to the substrates.

Accordingly, when the electric field is applied to the liquid crystal molecules, the liquid crystal molecules tilt in the arrangement directions of the projections 114, 115. In FIG. 9, the liquid crystal molecules tilt in the directions which cross the extending directions of the projections 114, 115.

As described previously, the projections 114 are formed on the TFT substrate 2, the projections 115 are formed on the color filter substrate 3, and the projections 114 and the projections 115 are formed alternately as viewed in a plan view and hence, the directions that the liquid crystal molecules tilt due to the projections 114 and the projections 115 become equal between the TFT substrate 2 and the color filter substrate 3.

Here, as shown in FIG. 9, the projections 114, 115 are bent in a zigzag manner and hence, as in the case of the liquid crystal molecules 116a, 116b, the direction that the liquid crystal molecules tilt differs depending on the directions along which the projections 114 and the projections 115 are formed.

In FIG. 9, the directions that the projections 114 and the projections 115 are bent are two directions and these directions cross the gate signal lines 21 and the drain signal lines 22 at an angle of approximately 45°.

As described previously, the slow axis of the alignment film 14 and the slow axis of the alignment film 18 cross each other orthogonally, while the direction along which the liquid crystal molecules tilt is equal between the TFT substrate 2 and the color filter substrate 3. Accordingly, even when the slow axis of the alignment film and the direction along which the liquid crystal molecules tilt are arranged on one substrate side, the slow axis of the alignment film and the direction along which the liquid crystal molecules tilt are not arranged and cross each other on another substrate side.

In general, the main chains in the alignment film molecules are arranged in the direction of the slow axis of the alignment film and hence, there exists a possibility that the liquid crystal is aligned in the direction of the slow axis. Although it is desirable to make the direction of the slow axis of the alignment film and the direction along which the liquid crystal molecules tilt agree with each other on one hand, to optically compensate for a viewing angle by the alignment films, on the other hand, it is necessary to overlap the alignment film 14 and the alignment film 18 such that the slow axis of the alignment film 14 and the slow axis of the alignment film 18 cross each other orthogonally. Accordingly, on either one of the substrate sides, the slow axis of the alignment film and the direction along which the liquid crystal molecules tilt are not arranged.

A drawback brought about by the fact that the slow axis of the alignment film and the direction along which the liquid crystal molecules tilt are not arranged can be overcome by restricting the directions along which the liquid crystal molecules tilt by the projections 114, 115.

Further, as shown in FIG. 9, the projections 114, 115 may be formed in a state where the projections 114, 115 are bent in a zigzag manner, and a region in which the slow axis of the alignment film and the direction along which the liquid crystal molecules tilt are not arranged can be formed on the TFT-substrate-2 side and the color-filter-substrate-3 side respectively. Although the drawback that the slow axis of the alignment film and the direction along which the liquid crystal molecules tilt are not arranged occurs on both of the TFT-substrate-2 side and the color-filter-substrate-3 side respectively, it is possible to make display quality uniform by allowing both substrates to compensate for each other.

As has been explained heretofore, according to the present invention, in the VA-mode liquid crystal display device, it is possible to impart the function of enlarging the viewing angle to the alignment film. Accordingly, the use of a plurality of expensive viewing-angle enlarging films in a laminating manner can be simplified thus achieving the reduction of a thickness of the film and the reduction of cost.

What is claimed is:

1. A liquid crystal display device, comprising:
   a first substrate;
   a second substrate;
   a liquid crystal layer which is sandwiched between the first and the second substrates;
   pixel portions which are arranged on the first substrate in a matrix array;
   a pixel electrode which is formed in the pixel portion and applies an electric field to the liquid crystal layer;
   a first organic alignment film formed on a liquid-crystal-layer side of the first substrate and having a liquid-crystal-layer side surface and a pixel electrode side surface; and
   a second organic alignment film formed on a liquid-crystal-layer side of the second substrate and having a liquid-crystal-layer side surface, wherein
   a first slow axis formed in the liquid-crystal-layer side surface of the first organic alignment film by aligning polymer chains due to the radiation of light and a second slow axis formed in the liquid-crystal-layer side surface of the second organic alignment film by aligning polymer chains due to the radiation of light are arranged to cross each other,
   the first organic alignment film is an index ellipsoid having retardation,
   the second organic alignment film is an index ellipsoid having retardation,
   a direction along which liquid crystal molecules tilt when an electric field is applied to the liquid crystal layer, is different from one of the first slow axis and the second slow axis, and
   a main chains in molecules of the first organic alignment film are arranged to form the first slow axis.

2. A liquid crystal display device according to claim 1, wherein the liquid crystal molecules are aligned in a VA mode in which the liquid crystal molecules are aligned in a direction perpendicular to the first organic alignment film and the second organic alignment film.

3. A liquid crystal display device according to claim 1, wherein the radiation of light is the radiation of polarized ultraviolet rays.

4. A liquid crystal display device, comprising:
   a first substrate;
   a second substrate;
   a liquid crystal layer which is sandwiched between the first and the second substrates;
   pixel portions which are arranged on the first substrate in a matrix array;
   a pixel electrode which is formed in the pixel portion and applies an electric field to the liquid crystal layer;
   a first organic alignment film formed on a liquid-crystal-layer side of the first substrate and having a liquid-crystal-layer side surface and a pixel electrode side surface;
   a second organic alignment film formed on a liquid-crystal-layer side of the second substrate and having a liquid-crystal-layer side surface;
   first electrodes which are formed on the first substrate and arranged in a first direction; and
   second electrodes which are formed on the second substrate, wherein
   a first slow axis formed in the liquid-crystal-layer side surface of the first organic alignment film by aligning polymer chains due to the radiation of light and a second slow axis formed in the liquid-crystal-layer side surface of the second organic alignment film by aligning polymer chains due to the radiation of light are arranged to cross each other, and
   liquid crystal molecules tilt in a direction which crosses the first direction when an electric field is applied to the liquid crystal layer,
   the first organic alignment film is an index ellipsoid having retardation,
   the second organic alignment film is an index ellipsoid having retardation,
   the direction along which the liquid crystal molecules tilt is different from one of the first slow axis and the second slow axis, and
   a main chains in molecules of the first organic alignment film are arranged to form the first slow axis.

5. A liquid crystal display device according to claim 4, wherein the liquid crystal molecules are aligned in a VA mode in which the liquid crystal molecules are aligned in a direction perpendicular to the first organic alignment film and the second organic alignment film.

6. A liquid crystal display device according to claim 4, wherein the radiation of light is the radiation of polarized ultraviolet rays.

7. A liquid crystal display device, comprising:
   a first substrate;
   a second substrate;
   a liquid crystal layer which is sandwiched between the first and the second substrates;
   pixel portions which are arranged on the first substrate in a matrix array;
   a pixel electrode which is formed in the pixel portion and applies an electric field to the liquid crystal layer;
   a first organic alignment film formed on a liquid-crystal-layer side of the first substrate and having a liquid-crystal-layer side surface and a pixel electrode side surface;
   a second organic alignment film formed on a liquid-crystal-layer side of the second substrate and having a liquid-crystal-layer side surface;
   first projections which are formed on the first substrate and extend while being bent in a first direction as well as in a second direction which crosses the first direction; and
   second projections which are formed on the second substrate and extend while being bent in the first direction as well as in the second direction which crosses the first direction in the same manner as the first projections, wherein
   a first slow axis formed in the liquid-crystal-layer side surface of the first organic alignment film by aligning polymer chains due to the radiation of light and a second slow axis formed in the liquid-crystal-layer side surface of the second organic alignment film by aligning polymer chains due to the radiation of light are arranged to cross each other, and liquid crystal molecules tilt in directions which cross the extending directions of the first projections and the second projections when an electric field is applied to the liquid crystal layer, the first organic alignment film is an index ellipsoid having retardation, the second organic alignment film is an index ellipsoid having retardation, the direction along which the liquid crystal molecules tilt is different from one of the first slow axis and the second slow axis, and a main chains in molecules of the first organic alignment film are arranged to form the first slow axis.

8. A liquid crystal display device according to claim 7, wherein the liquid crystal molecules are aligned in a VA mode in which the liquid crystal molecules are aligned in a direction perpendicular to the first organic alignment film and the second organic alignment film.

9. A liquid crystal display device according to claim 7, wherein the radiation of light is the radiation of polarized ultraviolet rays.

* * * * *